United States Patent [19]

Lillquist et al.

[11] Patent Number: 4,656,331

[45] Date of Patent: Apr. 7, 1987

[54] INFRARED SENSOR FOR THE CONTROL OF PLASMA-JET SPRAY COATING AND ELECTRIC ARE HEATING PROCESSES

[75] Inventors: Robert D. Lillquist, Schenectady, N.Y.; Richard G. Menzies, Wyoming; Richard W. Lober, Cincinnati, both of Ohio

[73] Assignee: General Electric Company, Schenectady, N.Y.

[21] Appl. No.: 710,765

[22] Filed: Mar. 11, 1985

Related U.S. Application Data

[63] Continuation-in-part of Ser. No. 442,542, Nov. 18, 1982, which is a continuation-in-part of Ser. No. 371,704, Apr. 26, 1982, Pat. No. 4,484,059.

[51] Int. Cl.[4] .............................................. B23K 15/00
[52] U.S. Cl. ....................... 219/121 PL; 219/121 PT; 219/124.34
[58] Field of Search .................. 219/121 PT, 121 PY, 219/121 PD, 121 PL, 76.16, 124.34, 130.01, 130.21; 313/231.31; 315/111.21; 356/43, 45–48

[56] References Cited

U.S. PATENT DOCUMENTS

| | | | |
|---|---|---|---|
| 3,602,683 | 8/1971 | Hishida et al. | 219/121 PU |
| 3,664,942 | 5/1972 | Havas et al. | 204/192 E |
| 3,873,836 | 3/1975 | Greene | 250/330 |
| 3,942,010 | 3/1976 | Peterson et al. | 250/332 |
| 4,280,137 | 7/1981 | Ashida et al. | 358/101 |
| 4,427,306 | 1/1984 | Adamson | 374/128 |
| 4,435,149 | 3/1984 | Astheimer | 250/339 |

FOREIGN PATENT DOCUMENTS

| | | |
|---|---|---|
| 2749117 | 5/1979 | Fed. Rep. of Germany . |
| 39-14375 | 7/1964 | Japan ............................. 219/121 PU |
| 901202 | 7/1982 | United Kingdom . |

*Primary Examiner*—M. H. Paschall
*Attorney, Agent, or Firm*—Lawrence D. Cutter; James C. Davis, Jr.; Marvin Snyder

[57] ABSTRACT

A multi-purpose optical sensor operates in the medium-to-far infrared wavelength spectral region to sense the surface temperature of plasma-jet spray coating materials. This plasma itself emits little or no radiation in this region and, accordingly, the output signal from the sensor is used to adjust the electrical input and other variables associated with the plasma spray torch to insure that particles arriving at the substrate surface to be coated are, in fact, in a molten state. The sensor employs infrared filters and, additionally, the sensor is used to monitor not only coating and temperature but also plasma beam divergence and particle seeding density to provide other control functions.

In another embodiment, the sensor is used to measure the temperature and size of a molten metal pool in the presence of an electric arc, as in the case of the melting and pouring of metal to form ingots, and to control the electric arc and other melting parameters so as to control the size and temperature of the molten pool. It may also be used to locate the position of foreign matter on the surface of the molten pool and to manipulate the arc so as to move the foreign matter away from the pouring region, thereby restricting the amount of such foreign matter which enters the poured metal stream, thus producing cleaner ingots having improved freedom from inclusions.

8 Claims, 5 Drawing Figures

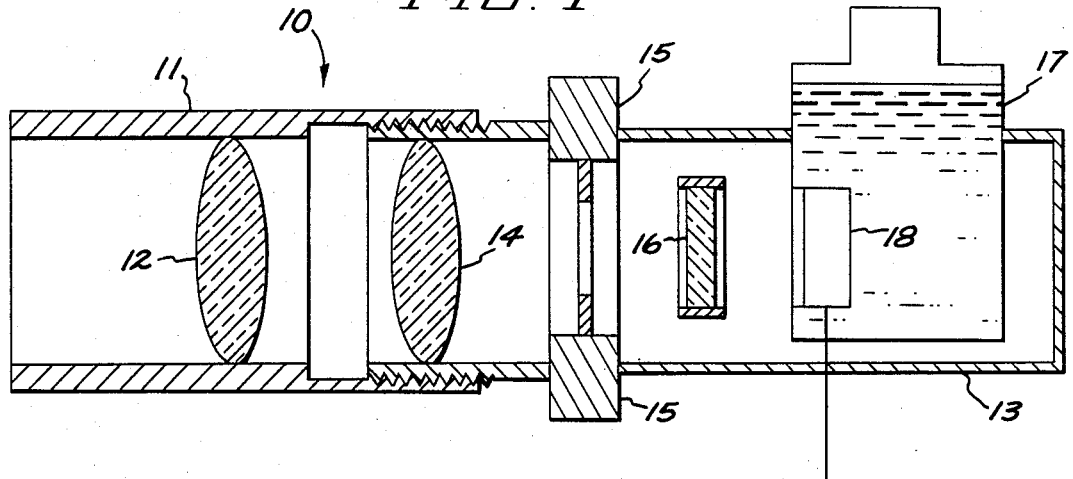
FIG. 1
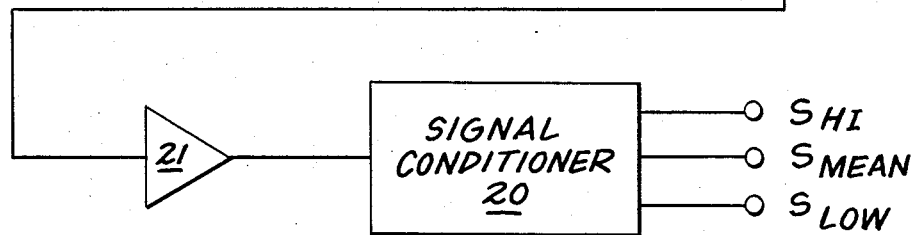
FIG. 2
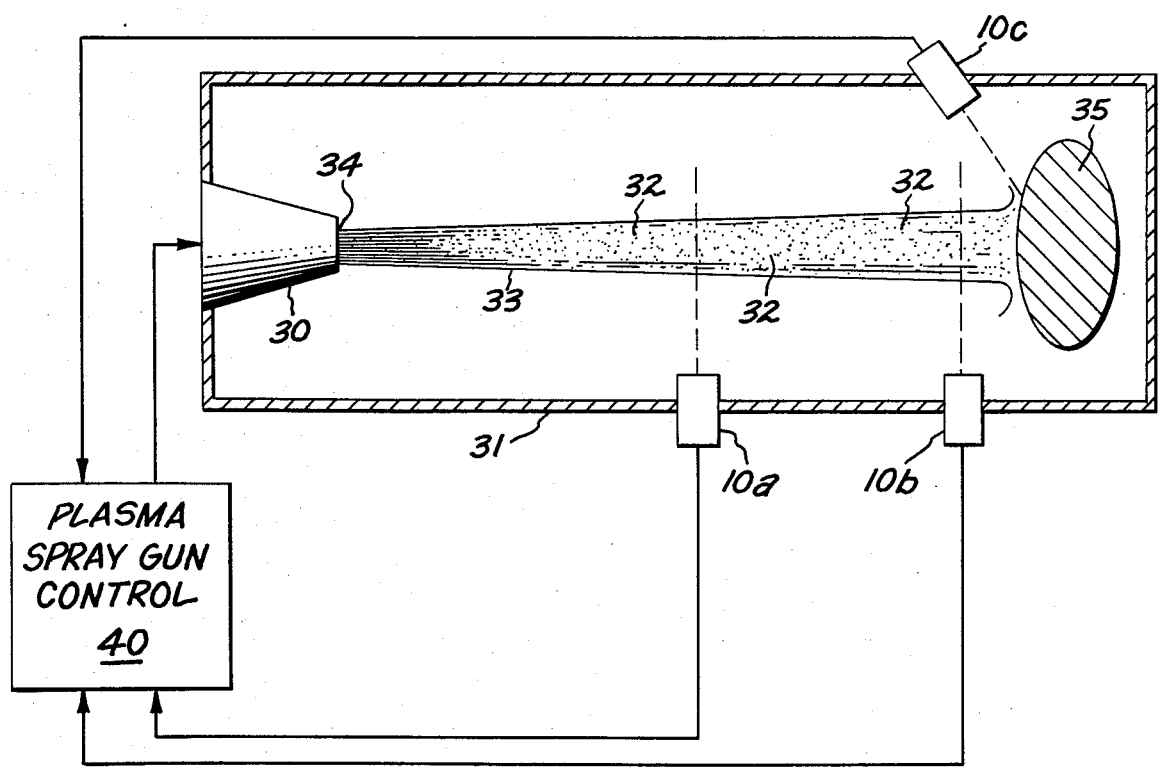

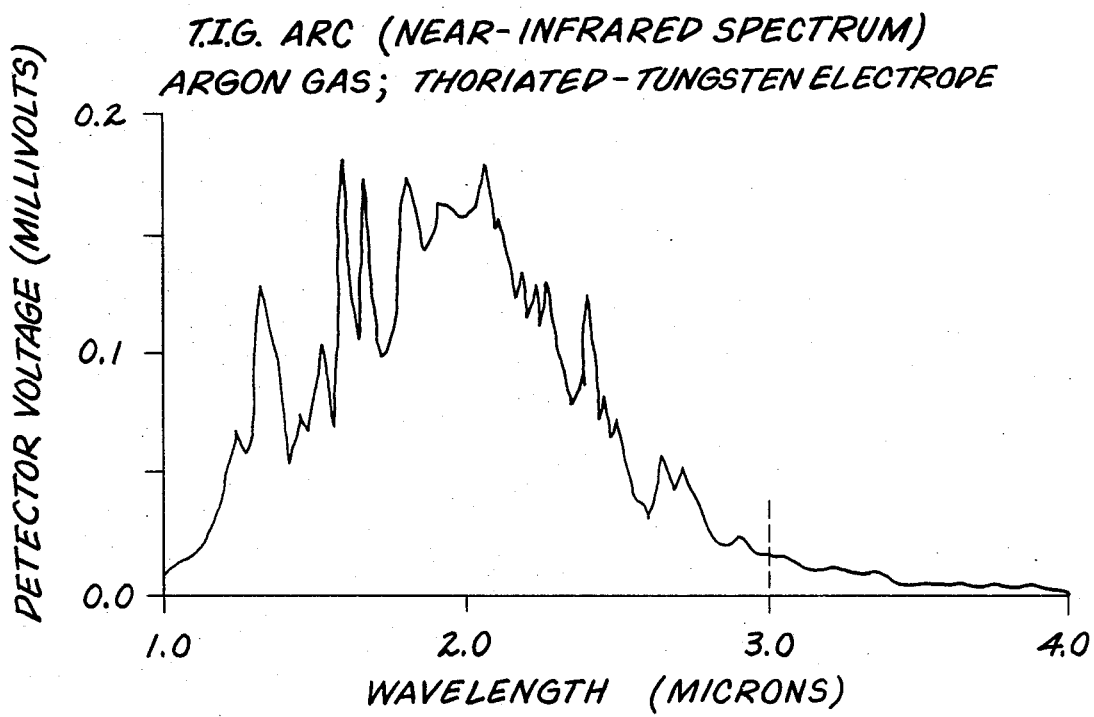
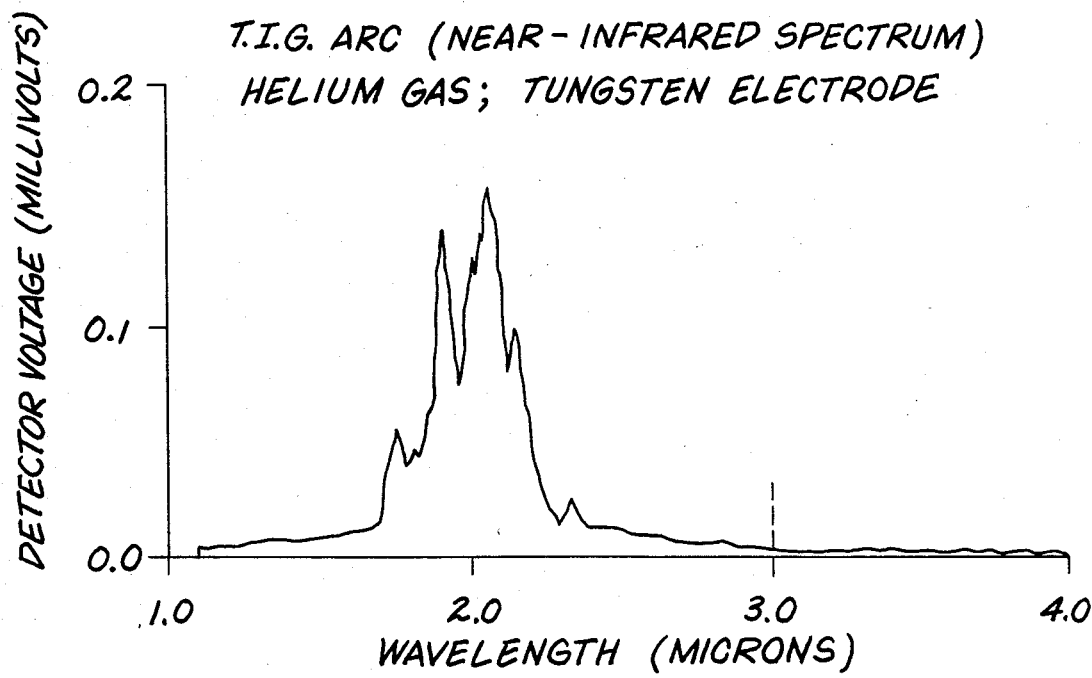

INFRARED SENSOR FOR THE CONTROL OF PLASMA-JET SPRAY COATING AND ELECTRIC ARE HEATING PROCESSES

This application is a continuation-in-part of application Ser. No. 442,542, filed Nov. 18, 1982 pending, which in turn in a continuation-in-part of application Ser. No. 371,704, filed Apr. 26, 1982, now U.S. Pat. 3,484,059.

BACKGROUND OF THE INVENTION

This invention relates to sensors for use in plasma spray jet processes and electric arc melting processes. More particularly, the present invention relates to infrared (IR) sensors and plasma spray jet torches controlled with the assistance of such sensors so as to ensure that particles arriving at the substrate to be coated are in a molten state. The invention also relates to infrared sensors and electric arcs (including plasma melting arcs or plumes) controlled with the assistance of such sensors fo measure the temperature and size of molten metal pools and to the control of foreign matter thereon to ensure the pouring of substantially foreign matter-free streams of the molten metal as into ingots. Other variables may be also monitored and controlled.

In plasma spray processes for coating various substrate materials with protective coatings, particulate matter is injected into a plasma-jet which is directed at the substrate. The substrate and particulate matter are typically metal with the particulate matter forming a complex protective coating on the substrate. The protective coating often exhibits superior properties of wear resistance or resistance to corrosion, for example. The structure and properties of the particulate coating are complex functions of plasma torch operating conditions such as the nature and the flow rate of the gases employed, the powder particle size and particle size distribution, the torch-to-substrate distance, electrical power supplied to the torch, and powder injection position, velocity and direction. Because of the large number of interrelated variables, the problem of controlling such a process is exceedingly difficult but for one observation: namely, that the particles must arrive at the substrate in a molten condition. Solid particles reaching the substrate can form, in effect, a defect n the coating. The minimum particle temperature in the plasma is perhaps the singlemost important parameter determining the integrity of the coating but until now, there was no effective means to monitor this parameter. This is due to the overwhelming infrared radiation levels emitted by the plasma as opposed to the particulate matter entrained in the plasma flow.

In short, the plasma spray process has been developed from flame spraying processes largely by empirical methods. The control of such processes is often accomplished through the sole use of empirical methods to ensure that the particles arrive at the substrate in a molten condition. However, because of the large number of variables occurring in such processes, automatic control has hitherto not been employed to control plasma spray jet processes.

In melting technology using heat sources such as electric and plasma arcs, there is a need to measure and to control the size and temperature of molten pools of metals and metallic alloys prior to pouring from their crucibles or hearths to form ingots. In order to produce metallic ingots having improved cleanliness, particularly reduced levels of oxide, there is an increasing need to restrict foreign matter floating on the surface of the molten pool from entering the molten metal stream poured from the melt crucible. Control of such parameters by prior art sensors is not possible due to the overwhelming infrared radiation levels emitted by the arc compared to that emitted from the molten metal surface and the floating foreign matter. However, the sensor described herein overcomes this problem.

Remote temperature measurements of particle temperatures in a plasma-jet have been attempted in research investigations by A. Vardelle and co-workers at the University of Limoges, France, using near-infrared photomultiplier-based optical pyrometers to deduce particle temperature distributions. However, visible and near-infrared measurements are affected by the radiation emitted by the plasma itself which is several thousand degrees higher (in any conventional temperature units) than the particle temperature. Other experimenters have employed videocon-type cameras for investigations of plasma arcs in arc torch welding. However, prior experimenters in the plasma spray jet processses have not appreciated the fact that the plasma of ionized noble gases emits little or no radiation in the far-infrared wavelengths. Only the continuous Planckian radiation from the entrained particles, that is the coating material, falls within this far-infrared range.

Other work in a related field has been reported in a progress report titled "Improvement of Reliability of Welding by In-Process Sensing and Control (Development of Smart Welding Machines for Girth Welding of Pipes)" submitted to the Department of Energy in June, 1981 by Jose Convert et al. This report describes initial experiments conducted using contact sensors (thermocouples) to probe the temperature distribution near weld puddles and seams. Attempts to use near-infrared photodiodes, described therein, for remote temperature sensing were not successful due to significant optical interference from plasma radiation reflected from the metal surface. In particular, Convert et al. propose using a simple optical filter to reduce the radiation from the plasma arc through use of materials similar to conventional welders' goggles.

SUMMARY OF THE INVENTION

In accordance with a preferred embodiment of the present invention, an infrared sensor for monitoring plasma spray jet processes comprises focussing means for receiving infrared radiation from the vicinity of a plasma spray jet together with infrared detection means for providing electrical signals in response to the intensity of the infrared radiation impinging upon the detection means; furthermore, filter means are disposed in the optical path between the detection means and the focussing means, the filter selectively passing infrared radiation having a wavelength greater than about 3 microns. In a preferred embodiment of the sensor of the present invention, the infrared detection means comprises either indium-antimonide or mercury-cadmium telluride detectors in contact with a cooling medium such as liquid nitrogen to provide the desired sensitivity in response to particulate thermal conditions. The present invention also preferably includes an iris diaphragm to narrow the angle of the view.

In another embodiment of the present invention, the infrared sensor described above is configured with a plasma spray jet apparatus for coating a specimen. This apparatus further includes a plasma spray gun with a nozzle which is disposed at least partially within an evacuable housing. Furthermore, there are provided means to control the spray gun in response to electrical signals provided by the above-described sensors. Depending upon the parameters of interest, one or more sensors may be employed and these may be directed at one or more regions of the plasma spray jet or at the substrate itself near to where the plasma spray jet impinges upon it. One or more sensors may also be employed in conjunction with a plasma melting apparatus, especially one for forming uncontaminated alloy products such as ingots.

Accordingly, it is an object of the present invention to provide a sensor for monitoring the temperature of particulate matter entrained within a plasma spray jet stream.

It is also an object of the present invention to provide means for more accurately controlling the temperature of particulate matter in plasma spray jets and, in particular, to ensure that the particles arrive at the substrate to be coated in a molten condition.

Further, it is an object of the present invention to provide a sensor and plasma spray gun apparatus to carry out the above-described objectives.

Lastly, but not limited hereto, it is an object of the present invention to provide a means for more accurately controlling the size and surface temperature of a molten pool during an arc melting process and to restrict the amount of floating islands of foreign matter entering the melt stream poured from the crucible to form such products as ingots.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a schematic diagram illustrating a preferred embodiment for the sensor of the present invention;

FIG. 2 is a schematic diagram illustrating another preferred embodiment of the present invention in which one or more of the sensors shown in FIG. 1 are configured with a plasma spray gun and control circuit for monitoring and controlling the plasma spray process;

FIG. 3 is a graph of detector output voltage as a function of wavelength for a welding process employing argon gas and a thoriated tungsten electrode; and FIG. 4 is a graph similar to that shown in FIG. 2 for a welding process employing helium gas and a tungsten electrode.

DETAILED DESCRIPTION OF THE INVENTION

Figure 5:
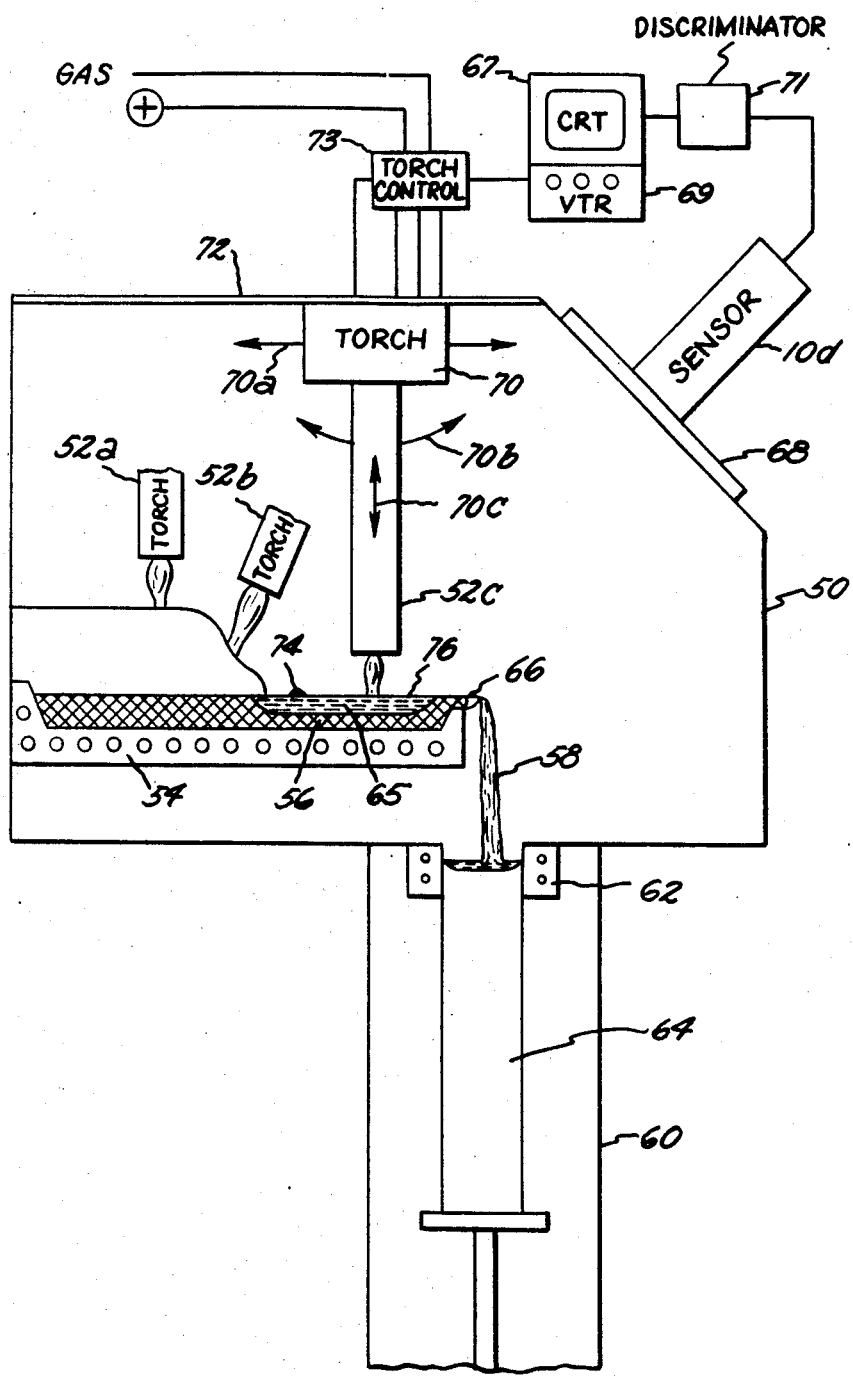
FIG. 5 is a schematic diagram illustrating another preferred embodiment in which one or more of the sensors shown in FIG. 1 are configured with an electric arc and control circuit for monitoring and controlling an arc melting process such as plasma arc melting.

FIG. 1 illustrates a preferred embodiment of a sensor 10 in accordance with the present invention. In particular, within one end of housing 13, infrared detector 18 is disposed within dewar 17 which preferably holds a cooling fluid such as liquid nitrogen. In general, it is desired that infrared detector 18 may be cooled to provide the desired degree of sensitivity and response time for the present invention. For example, in contrast to applications of devices similar to the instant sensor for use in arc welding operations, the level of irradiated infrared energy in the 3-14 microns wavelength spectral region is relatively low for particulate matter entrained within a plasma-jet stream, which is the application contemplated in the invention disclosed herein. Hence, liquid nitrogen or other cooling means is preferred to increase the desired detector sensitivity and dynamic range.

An important aspect of the present invention is the inclusion of long-pass infrared filter 16 disposed in optical path prior to detector 18. As discussed below with reference to FIGS. 3 and 4, it has been observed that the intensity of infrared radiation generated by the plasma itself is relatively low for the band of infrared wavelengths greater than approximately 3 microns. Accordingly, filter 16 acts to eliminate infrared noise signals from the plasma gases which would otherwise overwhelm the desired infrared signal from the entrained particulate matter. Thus, infrared long-pass interference filter 16 is provided to reduce this noise component.

With respect to detector 18 itself, it preferably comprises a liquid nitrogen-cooled material comprising either indium antimonide (InSb) or mercury-cadmium telluride (HgCdTe) infrared detector material. Such materials are conventionally employed in infrared radiometry carried out in this particular region of the infrared spectrum. While detector 18 may comprise a single element generating electrical signals in response to the intensity of infrared radiation impinging thereon, it is also possible to employ a linear array of infrared detectors for detector 18, particularly in the case that temperature profile measurements of particulate matter in the plasma spray jet are desired. Rectangular arrays may also be employed for imaging purposes.

Additionally, sensor 10 in FIG. 1 also preferably includes adjustable iris aperture 15 which characteristically exhibits a plurality of field stops, and functions to restrict the sensor's view to a narrow angle so as to prohibit background radiation from other solid body surfaces from reaching the detector. In particular, the view angle may be narrowed to prohibit background radiation from the substrate itself from interfering with measurements of the plasma-jet particulate matter taken in close proximity to the substrate being coated. Additionally, it is also preferably desired to include focussing means to provide proper sensor resolution. Focussing means are particularly important when detector 18 comprises a rectangular linear array of detector elements. While FIG. 1 illustrates a focussing system including a pair of lenses 12 and 14, it is well appreciated by those familiar with optics that the focussing system may, in fact, comprise a plurality of variously-configured lenses, or even a single lens by itself. In the instant diagram, lens 14 is a fixed lens disposed in housing 13; lens 12 is a movable lens disposed within lens barrel 11 which, for example, may be screw mounted onto housing 13. The principally-required characteristic of the lenses employed in the present invention is that they be transmissive to infrared radiation having a wavelength of 3 microns or greater. In particular, lens material comprising sapphire may be employed. However, since this is a relatively expensive lens material, alternate lens material includes KRS-5 which is a lens material comprising a mixture of thalium iodide and thalium bromide in crystalline form.

The electrical output signal from infrared detector 18 is preferably supplied to preamplifier 21 which operates to amplify the signal. The resulting signal from the preamplifier is then supplied to signal conditioner 20 which may be employed to provide one or more significant statistical indicators relating to the intensity of the infrared signal in the infrared band having a wavelength of 3 microns or higher. For example, signal conditioner 20 may operate to produce an output electrical signal $S_{HI}$ which is indicative of the peak infrared signal over a specified period of time. Similarly, signal conditioner 20 may also operate to produce an electrical signal $S_{LOW}$ which is indictive of a minimal level of infrared radiation in the appropriate band over a specified period of time. Additionally, signal conditioner 20 may also operate as an integrator thereby producing an output signal $S_{MEAN}$ which is indicative of the average value of infrared radiation impinging upon the detector over a given period of time. For use in the control of plasma spray jet processes, the period of time over which the samples are taken is generally between about 10 and 1,000 milliseconds in duration, although other durations may also be employed.

FIG. 2 illustrates an embodiment of the present invention in which sensor 10 of FIG. 1 is positioned in various locations in a plasma spray torch apparatus. The positioning of the various sensors is significant since each position shown in FIG. 2 is operative to measure a different parameter of the plasma spray process. For example, sensor 10a is best suited to monitor in-flight particle temperature. This sensor is also capable of monitoring particle number, particle density and beam divergence. For these reasons, sensor 10a is preferably implemented as a linear array of infrared detector elements. Such a linear array provides a preferred method and apparatus for measuring plasma-jet divergence. For these reasons, sensor 10a is preferably implemented as a linear array of infrared detector elements. In contrast, sensor 10b positioned and directed as shown in FIG. 2, is particularly suited for measuring particle temperature immediately prior to impact of the particle on parts or specimens or the like to be provided with the desired coating. Sensor 10b is the most desirable sensor to employ for the purpose of insuring that the particles entrained in the plasma-jet are molten just prior to impact upon substrate 35. However, if it is desired to measure the temperature of the coating itself, then a device positioned like sensor 10c is preferably employed.

FIG. 2 illustrates a conventional plasma spray jet apparatus in which the sensors of the present invention are deployed to monitor various aspects of the spray coating process. In particular, plasma spray torch 30 having nozzle 34 is disposed within vacuum chamber 31. Plasma spray torch 30 operates to direct plasma-jet 33 toward substrate 35 so that particles 32 entrained within the plasma jet are heated to molten temperatures prior to their impact on substrate 35. Sensors 10a, 10b and 10c are variously disposed to monitor certain aspects of the plasma spray jet process. Electrical output of each of these sensors is supplied to plasma spray gun control 40. This control operates to vary certain parameters (such as electrical power input) associated with plasma spray torch 30 in response to electrical signals provided by sensors 10a, 10b and 10c. It should be noted, however, that while FIG. 2 illustrates a plasma spray torch apparatus utilizing three infrared sensors, a greater or lesser number of sensors may be employed as desired to monitor various aspects of the process. It is also noted that plasma spray gun control 40 typically operates to control the electrical power suppleid to torch 30.

The sensor and plasma torch apparatus of the present invention is an outgrowth of experimental investigations of the infrared spectral characteristics of welding arcs. Pursuant to a hypothesis advanced by one of the inventors herein, if electronic transitions in the arc plasma are responsible for the bulk of radiation emitted by the welding arc, if was reasoned and demonstrated that, in the infrared spectral regions above 3 microns, no significant radiation would be emitted by the plasma. Experiments have confirmed this hypothesis with respect to electric arc plasmas. Accordingly, it is also found that plasma in a plasma spray torch operates in the same fashion to produce a similar infrared spectrum. FIGS. 3 and 4 illustrate such a spectrum for arc welding torches. In particular, FIG. 3 illustrates a plot of detector output voltage in millivolts as a function of wavelength for a tungsten inert gas (TIG) arc. The inert gas employed was argon and the electrode material employed was thoriated tungsten. A similar plot is shown in FIG. 4 which illustrates the near-infrared spectral distribution of a tungsten inert gas arc in which the inert gas employed was helium and the electrode material substantially comprised only tungsten itself. Again it is seen that the infrared radiation from the arc itself is somewhat band limited centering around a wavelength of about 2 microns and extending from about 1½ to about 2½ microns. Thus, an optical filter having a cut-on wavelength of about 3 or 3.5 microns placed in the optical path ahead of the detector 18 operates to effectively shield the detector from the infrared radiation produced by the plasma gases. Although the amplitudes shown in FIGS. 3 and 4 are somewhat distorted at either wavelength limit (a feature common to all grating spectrographs), the radiation signature of the arc clearly changes beyond about the 3 microns in wavelength from the intense line spectra typical of electronic transitions to faint continuous spectra. It is further seen that the observed line spectra originates entirely from the gas used. Workpiece or electrode material combinations showed no discernable effect on the arc radiation spectral line locations. Because these carrier gases are also used in plasma spray coating processes, and since plasma and arc welding temperatures are of the same order of magnitude, similar results are obtainable from spectral measurements of plasma-jet radiation.

It has also been discovered that the novel infrared sensor described herein has utility in the sensing and control of the temperature and size of a molten metallic pool in the case where electric arcs such as plasma arcs are used as the heating means to melt metals and metallic alloys in crucibles or hearths prior to casting. Although there would be no IR background interference, as in the case of an electric arc, a similar sensor could be used to control the same parameters in the case of electron beam melting.

FIG. 5 shows a typical apparatus for plasma skull melting in an inert gas filled melt chamber 50. Melting of metal or metallic alloy which may be in the form of ingot 51, chips or recycled scrap takes place, using plasma heating torches 52a–c, in a cooled melting hearth 54 in which a frozen skull 56 forms and from which molten metal stream 58 exits into ingot-pull chamber 60. Heat is extracted from the molten stream by fluid-cooled chill blocks 62 and the me solidified into ingot 64. Sensor 10d is normally placed external to chamber 50 so as to view the complete molten pool 65 and in particular the area adjacent to pour lip 66. The material for window 68 is selected to allow radiation in the wavelength range of interest to pass.

In such applications, sensor 10d takes the preferred form of an imaging infrared radiometer. The image of the workpiece may be formed using a single detector and mechanical scanning means or hybrid configurations such as a linear array of detectors and mechanical scanning means or a two dimensional electronically scanned array of detectors. In addition, a variety of lenses may be used for selecting different fields of view of the workpiece, e.g., a wide angle lens may be used to obtain an overall view of the workpiece and a telephoto lens may be used to selectively enlarge one area of particular interest of the workpiece. An essential requirement of this sensor is that its effective wavelength response (detector+filters+optics+windows) must exclude wavelengths less than approximately 3 microns to eliminate plasma background radiation interference.

Cryogenically-cooled infrared photon detector materials, such as indium antimonide or various dopings of mercury cadmium telluride are preferred for their high sensitivity and speed. However the inventors recognize that less sensitive detector materials, such a pyroelectric crystals, could also be used in some implementations of the present invention provided that the spectral response requirements are met.

Using the setup schematically described in FIG. 5, images of a molten pool were displayed on cathode ray tube (CRT) 67 and recorded on video tape recorder 69. Using electronic grey-level discrimination circuitry means, 71, the periphery of the pool and the presence of the foreign matter floating on the surface were clearly imaged and the surface temperature of the pool could be measured after sensor calibration.

Knowing the surface metal temperature, the pool size, and foreign matter position, the operating conditions of the torch such as power and gas flow rate can be controlled as through control means 73. The output of sensor 10d, in conjunction with feedback controls of the kind so well known to those ordinarily skilled in the pertinent art as to need no explanation or illustration here, can also be used in conjunction with mechanical traversing means 70 in association with tracks 72 affixed to the ceiling of chamber 50 to position torch heat source 52c to melt selected areas of pool 76. Further, traversing means 70 can also be used to traverse plasma heat source 52c across pool surface 76 to "herd" the floating island of foreign matter 74 away from pour lip 66 to keep them out of pour stream 58 exiting melting hearth 54. As shown in FIG. 5 by double headed arrows 70b and 70c, traversing means 70 includes means for tilting heat source 52c and for changing its proximity to surface 76 of molten pool 65, respectively. Such traversing means may, in some instances as in the case where electron beams are used as the heating means, be replaced by magnetic deflecting means.

As used herein, with the embodiment of the invention described immediately above, the term foreign matter is used broadly to encompass anything which may be observed to float on the surface of pools of liquid metal or be entrained in liquid metal streams exiting the molten pool. Such foreign matter includes, for example, oxides, slag, nitrides, sulfides and carbides, and may be either in the solid state or the liquid state or at least give the appearance of being in the liquid state. When such foreign matter is found in the solidified product, it is referred to herein broadly as inclusions. Further, it is presently believed that the invention will be effective in the detection and "herding" (i.e., control) of both non-electrically conductive foreign matter as well as electrically conductive foreign matter having emissivities significantly different from that of the molten pool.

From the above it should be appreciated that the sensor of the present invention provides an effective means for measuring various plasma spray jet coating processes. It should also be apparent from the above that the infrared sensor of the present invention provides a means for controlling the plasma torch so that particles entrained in the plasma are made to impact upon the substrate in a molten condition. Furthermore, it is seen that this control may be effected using a feedback control loop and involving only one measured parameter, namely, the electrical power being supplied to the torch. This eliminates the necessity for controlling a large number of interrelated plasma torch parameters. However, it should also be realized that more complex control functions are also made possible by the present sensor.

It is yet further seen that the sensor of the present invention provides an effective means for the measurement of molten metal pool size and temperature measurement of the size and position of islands of foreign matter floating thereon in the presence of an electric heating arc. Further, when used in conjunction with electronic feedback controls, the output of the sensor can be used to adjust the temperature of the pool by controlling the power of the arc and to manipulate the arc to move the foreign matter islands so as to restrict the amount of foreign matter entering molten streams of metal poured from the pool thus producing cleaner products such as ingots having improved freedom from foreign matter inclusions.

While the invention has been described in detail herein in accord with certain preferred embodiments thereof, many modifications and changes therein may be affected by those skilled in the art. Accordingly, it is intended by the appended claims to cover all such modifications and changes as fall within the true spirit and scope of the invention.

The invention claimed is:

1. A plasma spray jet apparatus for coating a specimen, said apparatus comprising:
   a plasma spray gun having a nozzle through which particles and gas are ejected;
   a vacuum housing in which said specimen and at least said spray gun nozzle are disposed; and
   focussing means for receiving infrared radiation from the vicinity of said plasma spray jet;
   infrared detection means for producing electrical signals in response to the intensity of infrared radiation impinging upon said detection means;
   filter means disposed in the optical path between said detection means and said focussing means, said filter selectively passing infrared radiation having a wavelength greater than about 3 microns; and
   means to control said spray gun in response to said electrical signals from said infrared detection means.

2. The plasma spray jet apparatus of claim 1 in which at least one sensor is aimed at a mid-stream portion of said plasma spray jet.

3. The apparatus of claim 1 in which at least one sensor is aimed at said plasma spray jet just above the point of impact upon said substrate.

4. The apparatus of claim 1 in which at least one sensor is aimed at said substrate in the vicinity of impact by the plasma spray jet on said substrate.

5. Melting apparatus comprising:
(a) means for holding a molten pool of metal;
(b) heating means for producing said molten pool;
(c) traversing means for moving said arc means across the surface of said molten pool;
(d) means for sensing the size and temperature of said surface of said molten pool and any foreign matter floating therein, said means further including
   (i) focussing means for receiving infrared radiation from the vicinity of said molten pool;
   (ii) infrared detection means for producing electrical signals in response to the intensity of infrared radiation impinging upon said detection means; and
   (iii) filter means disposed in the optical path between said detection means and said focussing means, said filter selectively passing infrared radiation having a wavelength greater than about 3 microns;
   (iv) detector means for producing electrical signals in response to infrared radiation from said and
(e) control means for use in conjunction with said sensing means and said traversing means for positioning said heating means relative to said surface of said molten pool.

6. The apparatus of claim 5 wherein said heating means is an electric arc.

7. The apparatus of claim 6 wherein said electric arc is a plasma arc.

8. The apparatus of claim 5 wherein said heating means is an electron beam.

* * * * *